United States Patent [19]

Abeles et al.

[11] Patent Number: 4,684,565

[45] Date of Patent: Aug. 4, 1987

[54] X-RAY MIRRORS MADE FROM MULTI-LAYERED MATERIAL

[75] Inventors: Benjamin Abeles, Annandale; Wolfgang U. Eberhardt, High Bridge; J. Thomas Tiedje, Lebanon, all of N.J.

[73] Assignee: Exxon Research and Engineering Company, Florham Park, N.J.

[21] Appl. No.: 673,270

[22] Filed: Nov. 20, 1984

[51] Int. Cl.[4] ................................................ B32B 7/02
[52] U.S. Cl. ................................ 428/220; 428/912.2; 427/39
[58] Field of Search .......................... 427/39, 38, 162; 428/912.2, 446, 220

[56] References Cited

U.S. PATENT DOCUMENTS

| | | | |
|---|---|---|---|
| 3,626,252 | 1/1970 | Adams | 29/832 |
| 4,261,771 | 4/1981 | Dingle et al. | 148/174 |
| 4,262,056 | 4/1981 | Hubler et al. | 148/175 |
| 4,547,432 | 10/1985 | Pitts et al. | 428/912.2 |

Primary Examiner—Edith Buffalow
Attorney, Agent, or Firm—Ronald D. Hantman

[57] ABSTRACT

The present invention is an X-ray mirror including a multi-layered material in which the composition of the layers repeat, the repeat distance being between 8 and 250 A., In one embodiment, the mirror is produced by CVD. In another embodiment, the layers forming the structure are made of amorphous semiconductor or insulator material.

13 Claims, 10 Drawing Figures

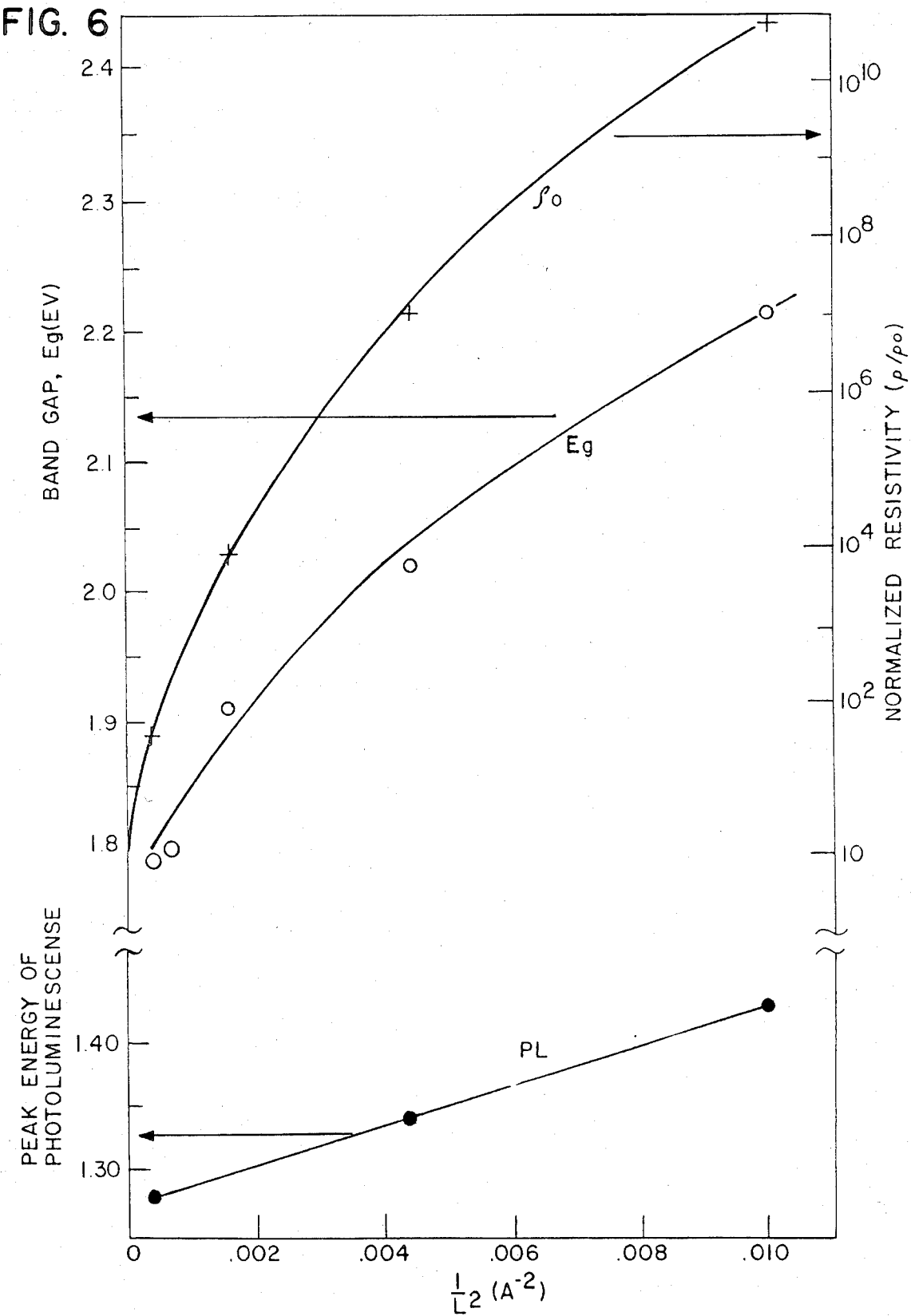

1000 A

X-RAY MIRRORS MADE FROM MULTI-LAYERED MATERIAL

BACKGROUND OF THE INVENTION

This invention relates to X-ray mirrors which include multi-layered material.

The ability of multi-layer materials to reflect X-rays with high efficiency depends on the structural quality of the interfaces between the layers. Semiconductor superlattices are one class of multi-layer materials in which the structural and electronic properties of the interfaces are highly perfect, and can be used as X-ray mirrors.

Layered crystalline semiconductor materials with periodic variations in composition in one dimension on the scale of 5-500A commonly known as superlattice structures (Esaki U.S. Pat. No. 3,626,257) have been found to exhibit many novel properties with numerous technological applications. In these materials good semiconducting properties, such as carrier mobilities and minority carrier lifetimes that are comparable to high quality bulk samples of the individual components require that the successive layers be grown epitaxially as single crystal sheets. This requirement is not easy to satisfy in practice and normally limits the composition of crystalline semiconductor superlattices to semiconductors and semiconductor alloys that are lattice matched or nearly lattice matched, and that can be deposited stoichiometrically by the techniques of thin film deposition. The degree of crystallinity of the superlattice material is then limited by the perfection of the substrate material and the ability of the deposited layers to replicate the underlying layers.

A further complication well-known in the art (see for example Dingle U.S. Pat. No. 4,261,771) is that even if the individual semiconductors comprising the intended superlattice material are lattice matched and can be deposited epitaxially as stoichiometric films, standard growth conditions still may not produce a superlattice material with substantially smooth layers since surface diffusion effects and nucleation effects may cause the semiconductor layers to grow in a columnar fashion or otherwise non-uniformly in the lateral direction perpendicular to the plane of the substrate. In this case it is unlikely that layered semiconductor films could be fabricated comprising individual sublayers that are coherent laterally and substantially smooth on the scale of a few interatomic distances. The mechanisms of thin film nucleation and growth are characteristically complex, in that they depend frequently in unexpected ways on the growth conditions such as the substrate temperature and the detailed structure and chemistry of the substrate surface. Thus, in general, one cannot predict what classes of materials or growth conditions can be used to fabricate superlattice structures.

FIG. 1 shows a schematic energy-band diagram of a superlattice structure having undoped crystalline layers where the alternating layers have substantially different compositions and the thickness of each layer is d/2.

Another advance in the field of materials science relating to semiconductor technology in recent years has been the discovery that amorphous semiconductors and insulators can be deposited by a variety of means, reactive sputtering and plasma-assisted chemical vapor deposition (PCVD) being the most popular, in the amorphous state in a substantially defect-free form (PCVD is also known as glow discharge deposition.) By substantially defect-free we mean free of chemically and electrically active coordination defects such as dangling bonds, to a level of better than about 1 defect per $10^3$ atoms. This defect-free property manifests itself as a low density of states in the gap, as measured for example, by the optical absorption coefficient for photons with an energy less than the optical bandgap. In one of the more thoroughly studied materials, namely amorphous silicon deposited by plasma assisted CVD from silane gas, the low density of defects is known to result from the passivation of dangling Si bonds by atomic hydrogen. The hydrogen content of these materials depends on the deposition conditions. The materials will be represented by the nomenclature a-Si:H, in the case of amorphous hydrogenated silicon, where the hydrogen content is understood to depend on the detailed nature of the film preparation process.

Prior to the present invention it was not known whether superlattice materials with substantially smooth sub-layers, only a few atomic layers thick (5-500A), can be fabricated from amorphous semiconductors and insulators while simultaneously maintaining their substantially defect-free properties, and whether they can be used as X-ray mirrors.

In view of the non-equilibrium nature of the growth process and the amorphous surface structure of these thin film amorphous semiconductors, prior to the present invention it was not known whether contiguous layers of different composition, a small number of atomic layers thick, can be deposited with long range ordering, that is over lateral distances large relative to the layer thickness, and as a result act as X-ray mirrors. Furthermore, if an amorphous superlattice material could be fabricated it is not known what the nature of the physical properties of this material would be. For example one of the most basic properties of a material namely the electronic energy level positions, can be calculated for crystalline semiconductors in terms of band theory which relies on the nearly perfect periodicity of the crystalline structure. In this case, the material properties can in principle be determined from the relevant electronic states and the band structure.

However, in amorphous materials the electronic energy levels cannot be calculated from the theory in the usual way because of the absence of long range periodicity. Although various alternative approaches have been tried with varying degrees of success, generally the theoretical work has at best succeeded only in describing known properties, without successfully predicting novel properties. Thus, it is not known how to predict the physical and chemical properties of an amorphous semiconductor material in which a periodic potential due to the superlattice structure is imposed in addition to the random atomic potentials of the underlying amorphous network.

The present invention is an X-ray mirror for larger than grazing incidence X-rays made from artificially produced multi-layers. Early attempts to make such X-ray mirrors, based on Bragg reflection from synthetic multi-layer materials, focused on materials in which one of the alternating layers is a high atomic number material such as tungsten and the other layer is a low atomic number material such as Carbon (see for example, T. W. Barbee, Am. Inst. of Phys. Conf. Proc. No. 75, "Low Energy X-ray Diagnostics", ed. D. T. Attwood and B. L. Henke, 1981). The idea is that alternating high atomic number/low atomic number layers will maximize the contrast in optical properties between the layers and hence maximizing the reflectivity for a given number of alternating layers.

However at wavelengths around the carbon, nitrogen and oxygen K shell absorption edges mirrors with alternating layers of Si/SiC, Si/SiN or Si/SiO$_2$ can have high optical contrast and because of the smooth quality of the plasma CVD deposited films will make excellent mirrors. As pointed out by R. P. Haelbich, A. Segmuller and E. Spiller (Appl. Phys. Lett. 34 184 (1979)) the smoothness of the layers can be as important as the optical contrast between the layers for good specular X-ray reflectivity.

One of the uses of the mirrors described in the present invention is in the optical system of X-ray lasers.

BRIEF DESCRIPTION OF THE FIGURES

FIG. 6 shows the normalized resistivity, optical gap, Eg, and energy of the peak in the photoluminescence emission, PL, as a function of a-Si:H sub-layer thickness L, plotted as $L^{-2}$, for a series of a-Si:H/a-Si$_{1-x}$N$_x$:H superlattice materials where the a-Si$_{1-x}$N$_x$:H sub-layer thickness is held fixed at 35A.

SUMMARY OF THE INVENTION

The present invention is an X-ray mirror including a multi-layered material in which the composition of the layers repeat, the repeat distance being between 8 and 800A. In one embodiment, the mirror is produced by CVD. In another embodiment, the layers forming the structure are made of amorphous semiconductor or insulator material.

DESCRIPTION OF THE PREFERRED EMBODIMENT

Figure 2:
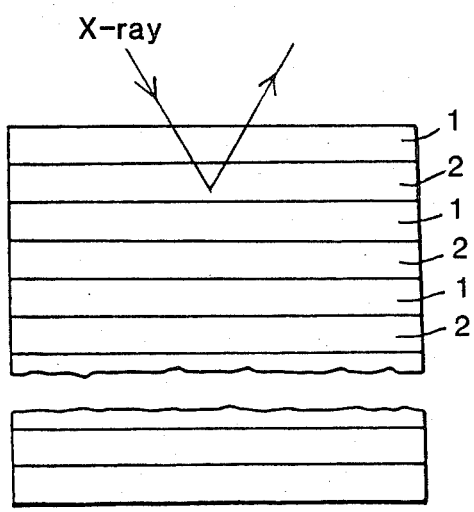
FIG. 2 is a schematic diagram of a superlattice structure.

FIG. 2 shows a schematic diagram of the present invention. The invention is an X-ray mirror which includes a composition of matter which comprises a multilayered material whose layers are thin sheets of semiconducting or insulating amorphous material.

Even though high intensity sources of X-rays are now available, their application in imaging and lithography is limited by the lack of high quality mirrors for focusing and collimated radiation with photon energies greater than about 35 eV. and less than about 1500 eV. The reason is that in this X-ray wavelength range mirrors constructed in an analogous way to those used in the ultraviolet and visible part of the spectrum, have low reflectivity, at normal or near normal incidence. By larger than grazing incidence we mean angles of incidence such that the direction of propagation of the incident or reflected X-ray beam is less than 85° from the surface normal to the X-ray mirror. Above 1500 eV. Bragg reflections from single crystals (e.g. Si, Ge) can serve as X-ray mirrors with high reflectivity at these angles of incidence. A solution that has been offered to this problem of larger than grazing incidence X-ray mirrors in the 35 eV. to 1500 eV. range is synthetic Bragg reflectors. These structures can be fabricated by evaporation, sputtering, CVD or plasma assisted CVD of alternating layers of two or more materials with different composition.

In these multi-layered mirrors generally a material of high scattering power for the X-rays to be reflected is alternated with one that has a low scattering power. These layers repeat with a period designed so as to match the wavelength of the X-rays inside the material. Thus these materials simulate the Bragg reflection conditions for X-rays in crystals but with a much longer period than natural crystals. By control of the individual layer thicknesses during the deposition of the multilayers, one can make materials that have reflectivity analogous to Bragg reflections in crystals, for any desired wavelengths in the 8-400A range.

Furthermore in order to reflect a band of X-ray wavelengths with a single multi-layer mirror, one can make multi-layers with a range of repeat distances. For example, in an X-ray fluorescence microprobe apparatus, sensitive to the density of carbon atoms in any chemical environment, one would like to have highly reflecting optics, for the wavelength range between 42A and 47A. A suitable mirror for normal incidence X-rays could be constructed from a multi-layer material with a repeat distance of 42A beginning at the substrate increasing monotomically with each success layer to a 47A repeat distance at the top surface.

For a multi-layer X-ray mirror in which the layer periodically is fixed, that is, a mirror designed to give maximum reflectivity at a single wavelength, $\lambda_o$, the total number of layer periods, N, defines the sharpness of the reflectivity maximums. That is the wavelength range of peak reflectivity extends from about $\lambda_o/2N$ above and below $\lambda_o$. (Such mirrors will effectively act as monochromators.) If the X-ray pathlength is not sufficiently long inside the mirror material to traverse all N layers, either because of absorption or because of strong reflectivity, than the band of peak reflectivity will be wider. The finite X-ray absorption coefficient, $\mu$, limits the number of layers contributing to the reflected signal to about (cosine $\theta$)/$\mu$d, where $\theta$ is the incidence angle and d is the repeat distance.

Ideally, for a multilayered material to make a practically useful X-ray mirror one would like the material to be hard so as to resist abrasion, and to be relatively refractory so as not to interdiffuse under illumination by high intensity radiation. If it is desirable for other reasons to make the multi-layer X-ray mirror from alternating layers of two materials which tend to interdiffuse, a thin layer of a third material may be deposited at the interfaces between the first two materials to act as a diffusion barrier to prevent the interdiffusion. For example two metals like Al and Au which are known to interdiffuse could be separated by a thin Si or C layer acting as a diffusion barrier.

Another requirement is that the layers be highly uniform, continuous and smooth with thicknesses in the 4-400 Å range. Many materials, such as low melting point transition metals for example, frequently tend to ball up and form discontinuous films in this thickness range, when deposited by evaporation. Any such non-uniformities will tend to scatter X-rays, and reduce the efficiency of the specular reflection.

Although the multi-layers can be deposited by evaporation, or sputtering, a preferred method is CVD, however a more preferred method is plasma assisted CVD. The preferred techniques have a number of advantages. First, CVD and plasma assisted CVD will produce a uniform coating over non-planar surfaces. For any focusing elements the multi-layer mirror must be deposited on a curved substrate. Second, plasma assisted CVD gives superior control over the layer thickness and reproducibility of the layer thickness. Control of the thickness of the individual layers to an accuracy of a single atomic layer is possible by plasma CVD.

The present invention shows that it is possible to make layered amorphous materials by plasma-assisted CVD that are nearly atomically smooth, have low defect density interfaces, and can be used as X-ray mirrors. Since these materials can be deposited over large areas of almost arbitrary shape with uniform thickness by low pressure CVD and plasma CVD, they are particularly well-suited for large area and non-planar X-ray mirrors.

Figure 9:
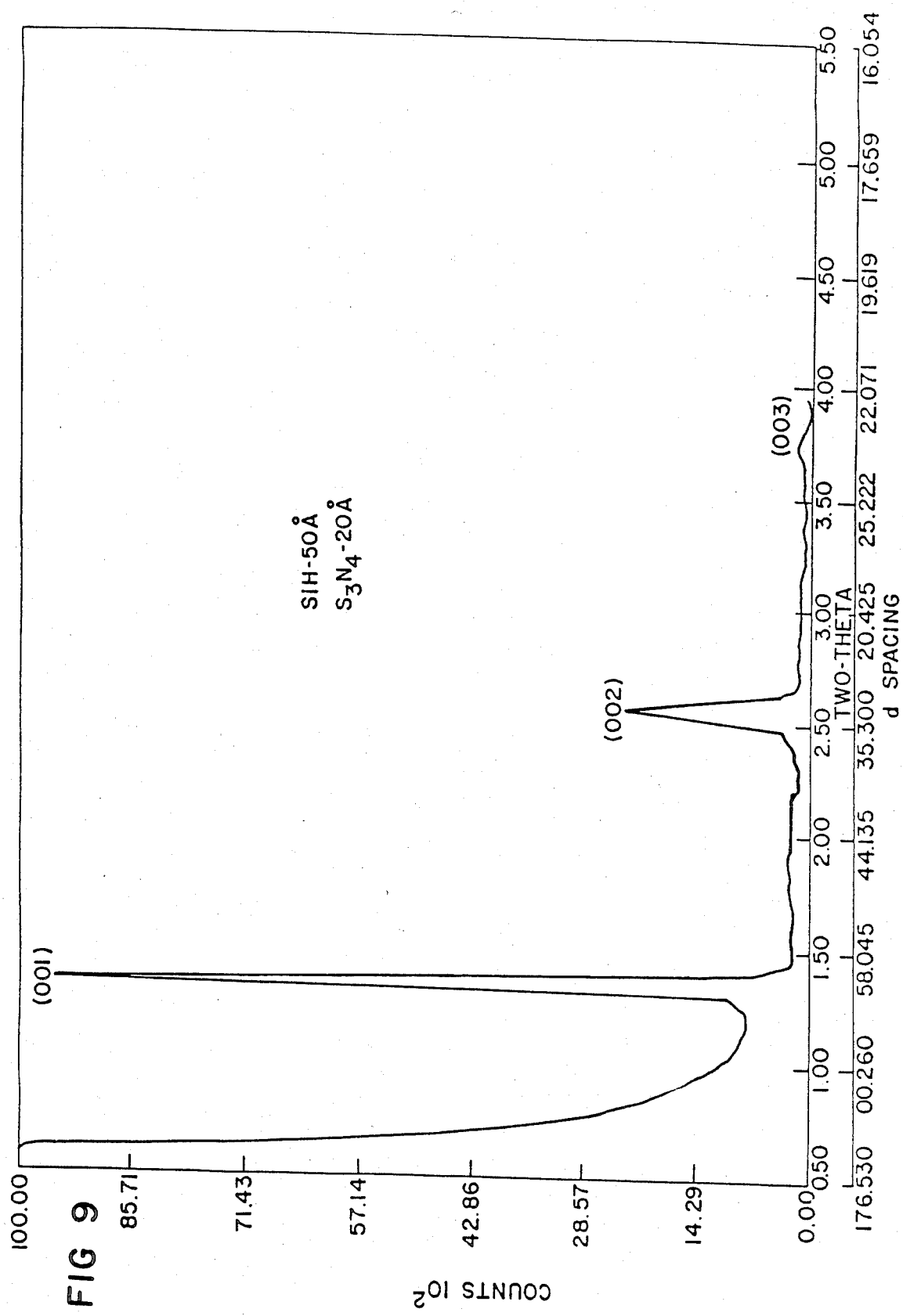
FIG. 9 is a graph of the characteristic X-ray diffraction pattern of a layered amorphous semiconductor superlattice material.
Figure 10:
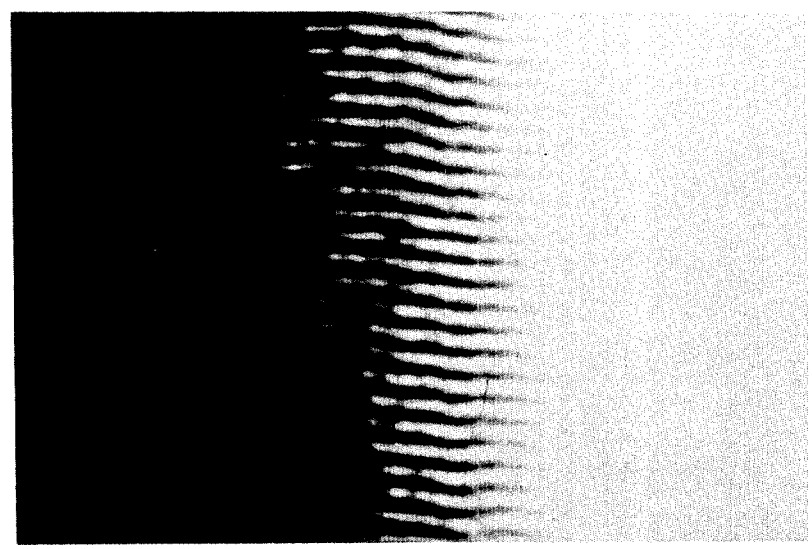
FIG. 10 shows a transmission electron microscope picture of a thin section of an amorphous semiconductor superlattice material wherein the repeat distance is 50A.

In FIG. 9 we show the X-ray reflectivity as a function of scattering angle for a layered material composed of alternating layers of hydrogenated amorphous silicon (41Å), amorphous silicon nitride (27Å), and an X-ray wavelength of 1.5Å. The amorphous structure of the materials and the low interdiffusion rate of the relatively refractory constituents minimize microstructure associated with crystallite facets, grain growth or agglomeration into islands. A TEM section of a a-Si:H/a-Ge:H layered sample deposited by plasma CVD is shown in FIG. 10, illustrating the uniformity of the structure that is possible by this technique.

Because these layered materials can be made from elements with low X-ray absorption (Si, O, N, C) and a high degree of uniformity in layer spacing, high reflectivity and spectral selectivity should be achievable at larger than grazing incidence. Near normal incidence optics are desirable to keep aberration low and to maximize the solid angle accepted. Another potentially important application of these mirrors with high reflectivity is in X-ray lasers.

In a preferred embodiment, the entire multilayered mirror structure is a thin film material, that is a material that is less than about 10 microns thick. The first and alternate layers 1, 3, 5 of the structure have the same given composition while the second and alternate 2, 4, 6 . . . have the same composition different from the given composition of layers 1, 3, 5 . . . . Therefore, the spatial repeat distance of the material is the thickness of layer 1 plus layer 2. That is, layer 3 plus layer 4 is a repeat of layer 1 plus layer 2, etc. While in this configuration the layers repeat like ABAB . . . , including a diffusion barrier would result in a configuration like ACBCACB-CACBCA where C is the diffusion barrier.

For purposes of illustration we discuss one embodiment of the present invention in which the multilayer X-ray mirror is an amorphous semiconductor or insulator superlattice.

Figure 1:
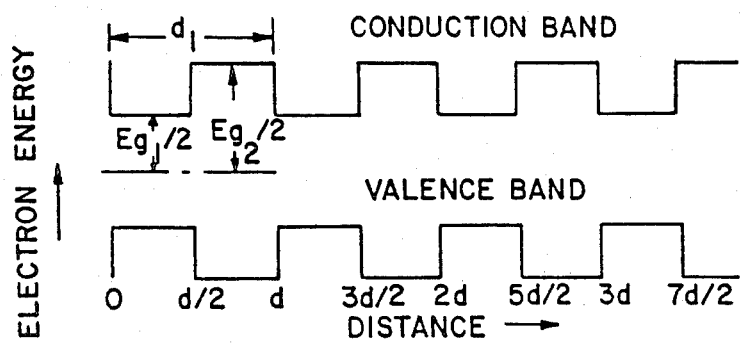
FIG. 1 shows a schematic energy band diagram for electrons and holes in semiconductor superlattice material, in which the compositional modulation is due to alloying or other gross compositional variation.

The optical reflectivity of any material is determined by its electronic structure, however description of the electronic energy levels in terms of well-defined E vs k relations, where E is the electronic energy and k is its wavevector, is not possible in amorphous semiconductors in the same way as it is in crystalline semiconductors. Nevertheless, some general features of the electronic energy level spectrum are known to be the same in both crystalline and low defect density amorphous semiconductors. For example, both types of semiconductors have a gap in the density of states between a broad distribution of filled levels (the valence band) and a broad distribution of empty levels (the conduction band). In crystals these energy bands have relatively sharp edges, broadened only by the thermal motion of the crystal lattice. In amorphous semiconductors the density of states edges are broader, being broadened by the structural disorder of the amorphous network in addition to the thermal motion of the atoms. The width of the low energy absorption tail of the optical absorption edge is one measure of the sharpness of the band edges in amorphous or crystalline semiconductors. In any case, an objective measure of the position of the band edges can be defined for both crystalline or amorphous semiconductors by, for example, the energy at which the density of states of the bulk material drops to $10^{20}$ cm$^{-3}$ ev.$^{-1}$. In this sense, energy band diagrams such as those shown in FIG. 1, as described above can equally well be applied to amorphous and crystalline semiconductors. The modulation in the band edge energies illustrated in FIG. 1 is obtained by modulation of the thin film composition.

Figure 3:
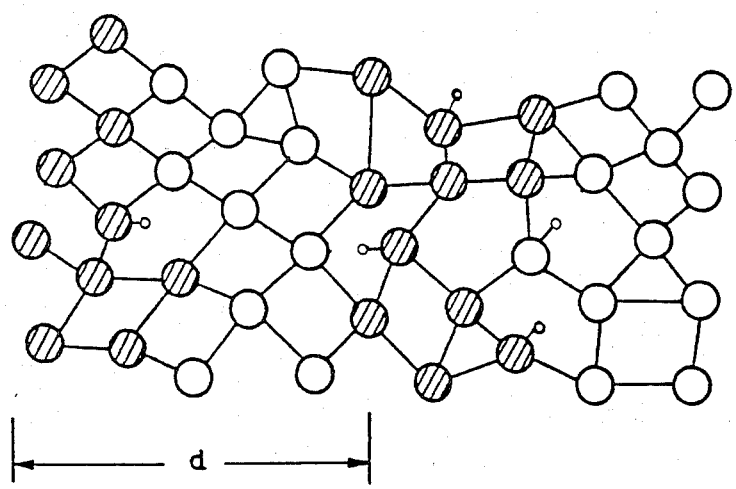
FIG. 3 is a schematic diagram of the position of the individual atoms in the superlattice structure of the present invention.

The interfacial regions between the layers of the amorphous semiconductor or insulator material are substantially defect free. Referring to FIG. 3 shows a schematic diagram of the lattice structure of the present invention in which the atoms of the alternating layers are indicated by light and dark circles, and hydrogen atoms are indicated by light smaller circles. The period of the structures is d. As indicated in FIG. 3, there are substantially no dangling bonds to give rise to defects at the interfaces.

Examples of amorphous semiconducting and insulating materials that can be fabricated into amorphous semiconductor superlattices according to this invention, include:

GROUP IVA ELEMENTS AND ALLOYS WHICH INCLUDE a-Si:H, a-Ge:H, a-Si$_{1-x}$C$_x$:H, a-Si$_{1-x}$Ge$_x$:H, a-Si$_{1-x}$N$_x$:H, a-Si$_{1-x}$Sn$_x$:H, a-Si$_{1-x}$O$_x$:H, a-C:H (tetraedrally coordinated) a-Si$_{1-x-y}$O$_x$N$_y$:H plus alloys and halogenated (F, Cl) versions of the hydrogenated materials listed. (e.g. a-Si$_{1-x-y}$Ge$_x$Sn$_y$:H:F).

As used herein, the subscripts are the atomic fractions of the elements in the material. For example, if $x=\frac{2}{3}$, then a-Si$_{1-x}$O$_x$:H is a-Si$_{\frac{1}{3}}$O$_{\frac{2}{3}}$:H which is a-SiO$_2$:H.

Layers 1, 3, 5 ... and layers 2, 4, 6 ... may comprise any two of the materials, e.g. a-Si:H/a-Si$_{1-x}$N$_x$:H.

The X-ray mirror of the present invention also includes layered materials where the composition of each layer is modulated across the layers. For example, if the alternating layers are a-Si:H and a-Ge:H alloys, the transition from a-Si:H to a-Ge:H and from a-Ge:H to a-Si:H may occur gradually over the layer thicknesses starting with a-Si:H, gradually increasing the percentage of a-Ge:H until it is all a-Ge:H. In the next adjacent layer, the percentage of a-Si:H is increased until it is all a-Si:H. All succeeding layers repeat this sequence.

The materials in the two groups can be prepared by glow discharge decomposition of gaseous mixtures of volatile hydrides, fluorides or chlorides or of the elemental gases themselves in the case of O$_2$, N$_2$, Cl$_2$ and F$_2$, as described below.

MATERIAL PREPARATION

There are several deposition processes that are known to produce low defect density amorphous semiconductors. Insulators and metals can also be produced by these techniques. These include PCVD, low temperature CVD and sputtering. Low temperature CVD is restricted to reactive gases that decompose at relatively low temperaure such as for example Si$_2$H$_6$. Sputtering has the advantage of being capable of producing a wider variety of amorphous semiconductor materials than can be made by PCVD or CVD, however, sputtered films usually contain more defects then PCVD films. We describe here a method for using PCVD to make amorphous semiconductor superlattices. To make amorphous semiconductors superlattices by CVD we simply omit the electric discharge used in the PCVD technique. To make amorphous semiconductor superlattices by sputtering it is possible to modify the technique (A. H. Eltoukhy and I. E. Greene *J. Appl. Phys.* 50, 505(1979)) for making crystalline semiconductor superlattices by changing the deposition conditions (e.g. substrate temperature, gas pressure and addition of H$_2$ to the plasma discharge) to produce hydrogenated amorphous rather than crystalline semiconductors.

Figure 4:
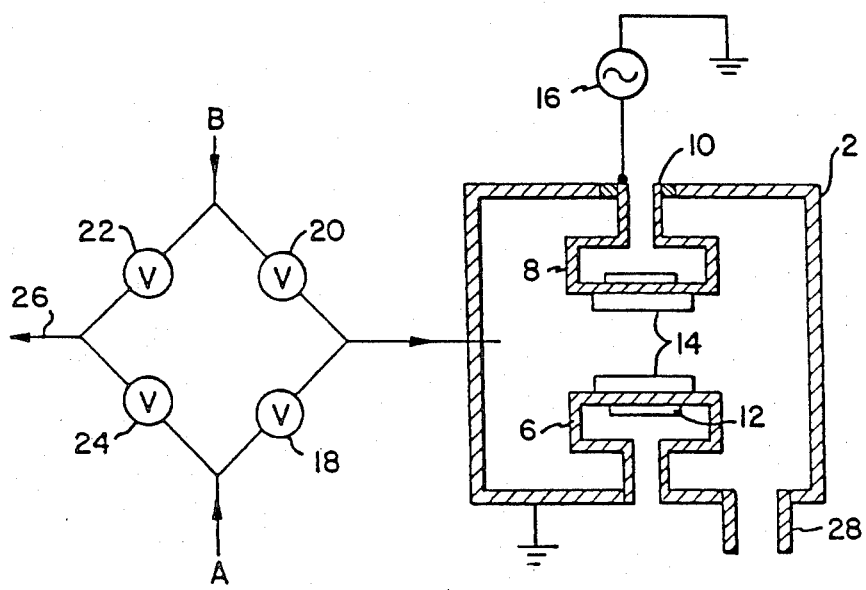
FIG. 4 is a schematic diagram of a plasma assisted chemical vapor deposition reactor.

Referring to FIG. 4 a PCVD apparatus for carrying out the fabrication of the material of the present invention is designated as 2. The PCVD apparatus includes a vacuum chamber typically of stainless steel. In the vacuum chamber 4 are electrodes 6 and 8. Electrode 6 is grounded and refered to as the anode. Electrode 8 is insulated from the stainless steel chamber by insulator 10 and is referred to as the cathode. Flat heaters 12 are contained in the electrodes. Substrates 14 which can be insulators such as quartz or metals such as stainless steel are placed in good thermal contact with the electrodes.

The plasma is produced by a low power (5–10 W) RF (13.5 MHz) discharge, by means of an RF generator 16 connected to the cathode. To deposit layered films the composition of the gas in the reactor 2 is changed periodically by opening and closing alternately neumatic valves 18 and 20 to admit gas A or gas B into the reactor.

In order to avoid setting up pressure transients through the opening and closing of valves 18 and 20 the gases A and B are alternatively shunted into a ballast pump 26 by opening and closing valves 22 and 24 in phase with valves 18 and 20, respectively. The gases are pumped continuously out of the reactor by a pump through outlet 28. The same scheme can be easily extended to more than two gases or gas mixtures.

To achieve abrupt changes in composition between adjacent layers requires that the time it takes to change gases in the reactor (molecular residence time) be short compared to the time it takes to grow a monolayer. The molecular residence time $\tau_R$ is given by $$\tau_R = (Vp/F_o p_o)$$

where V is the volume of the reactor, p is the gas pressure in the reactor and $F_o$ is the gas flow rate at standard pressure $p_o$. $\tau_R$ can be varied over a wide range of values. In our experiments we have used V=30 liters, p=30 m torr, $F_o$=0.1 liter/min which gives $\tau_R$=1 sec. With a typical deposition rate of 1 Å/sec. the transition from one layer to the next takes place over a distance of less than a single atomic layer. The sub layer thickness is given by the product of the deposition rate and the flow period of the gas. The thickness of the sublayers can be varied from a submonolayer to thousands of angstroms.

Example of amorphous semiconductor superlattices that have been produced include:

a-Si:H/a-Ge:H
a-Si:H/a-Si$_{1-x}$N$_x$:H
a-Si:H/a-Si$_{1-x}$C$_x$:H

The a-Si:H sublayers were made from pure SiH$_4$. The Ge:H sublayers were made from a mixture of 10% GeH$_4$+90% H$_2$. The a-Si$_{1-x}$C$_x$:H sublayers were made from a mixture of 50% SiH$_4$+50% NH$_3$. The a-Si$_{1-x}$N$_x$:H layers were made from a mixture of 20% SiH$_4$+80% NH$_3$. The substrate temperatures were in the range 200°–250° C.

The properties of the composition of matter used in the present invention are believed to be modified by the quantum size effects brought about by the dimensions of the layered material. The quantum effects manifest themselves in the optical and electrical properties of the material. Some of these physical properties are discussed below. The quantum effects brought about by the dimensions of the layered material are expected to have an appreciable effect on the properties of the material only if the energy level shifts introduced by the quantum effect are greater than about kT, where T is the temperature at which the properties are measured (~25 mev at room temperature).

OPTICAL PROPERTIES

Figure 5:
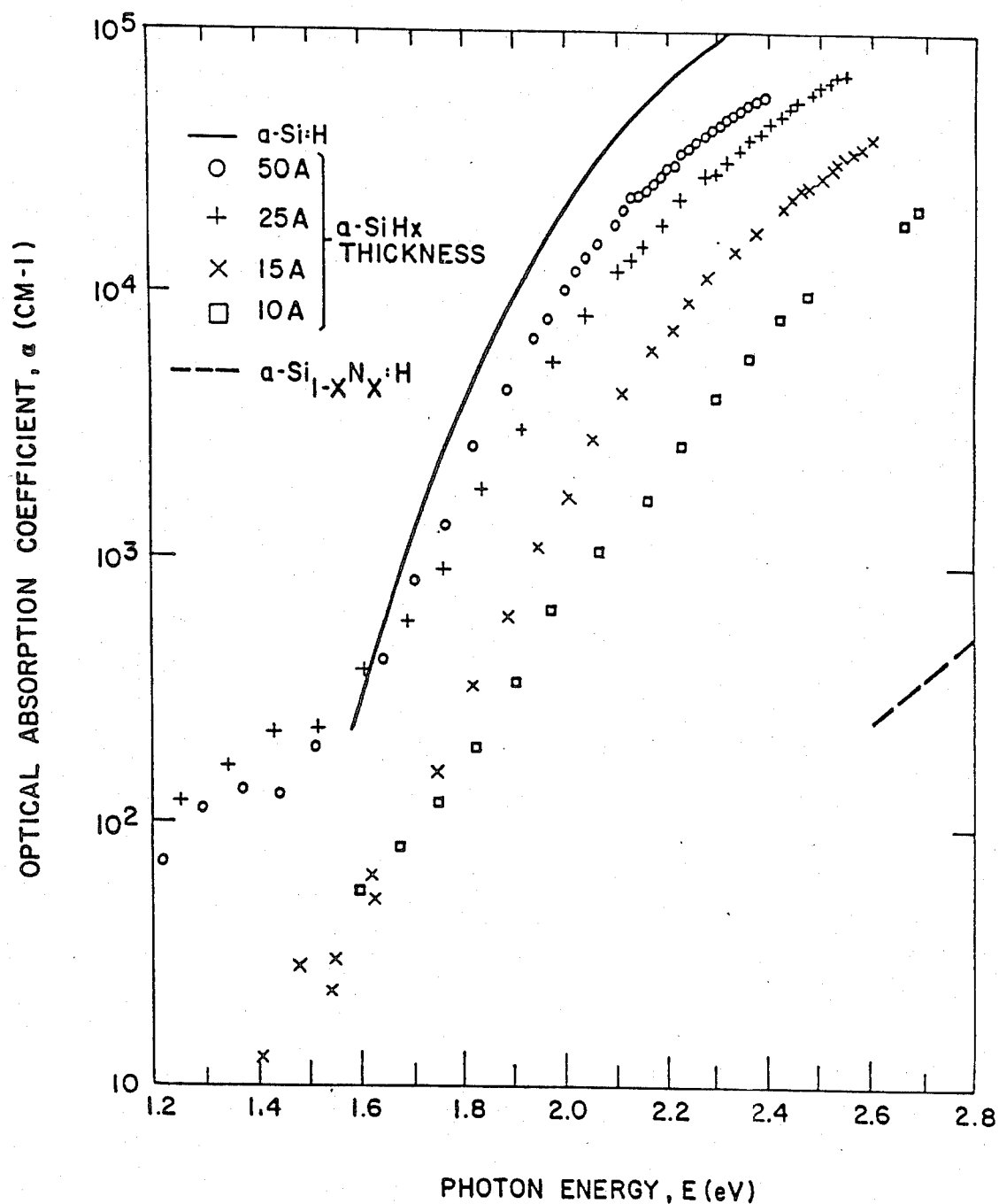
FIG. 5 shows optical absorption coefficient for four a-Si:H/a-Si$_{1-x}$N$_x$:H superlattice materials where the a-Si$_{1-x}$N$_x$:H sub-layer thickness is held fixed at 35A and the a-Si:H sub-layer thicknesses have the indicated values. Also shown is the optical absorption coefficient of a homogeneous a-Si:H film and a homogeneous a-Si$_{1-x}$N$_x$:H film grown under the same conditions as in the superlattice materials.

The optical properties of a variety of a-Si:H/a-Si$_{1-x}$N$_x$:H superlattice materials have been investigated. The optical absorption coefficient $\alpha$ as a function of photon energy E is shown in FIG. 5 for four different superlattice materials all with the same a-Si$_{1-x}$N$_x$:H sublayer thickness (~35A) but with the a-Si:H sublayer thickness varying from about 50A to about 10A. By extrapolating to $\alpha=0$ a linear fit to the optical absorption data plotted as $(\alpha E)^{\frac{1}{2}}$ as a function of E, where E is the photon energy, as is customarily done in the amorphous semiconductor field to determine optical bandgaps, we found that the optical gap increased by about 0.5 ev when the a-SiH$_x$ sublayer thickness was reduced from 50A to 10A. It is worth noting that the above-mentioned method for determining the optical gap involving the extrapolation of $(\alpha E)^{\frac{1}{2}}$ to $\alpha=0$ is not dependent in any essential way on an the accurate knowledge of the thickness of the deposited film.

Also shown in FIG. 5 is the optical absorption coefficient for a film comprising only a-Si:H deposited under the same conditions as in the superlattice and a film comprising only a-Si$_{1-x}$N$_x$:H also deposited under same conditions as in the superlattice film. Note that the optical absorption of the superlattice materials cannot be represented as a linear combination of the two constituents. Not only does the magnitude of the optical gap change with a-Si:H sublayer thickness, but also the slope of the low energy exponential part of the absorption edge changes with a-Si:H layer thickness, as illustrated in FIG. 5.

The increase in optical gap for the material with decreasing layer thickness is believed to be associated with the quantum confinement of conduction band electrons into two dimensional potential wells formed by the a-Si$_{1-x}$N$_x$:H/a-Si$_{1-x}$N$_x$:H sandwiches, as illustrated schematically in FIG. 1. In the limiting case that the potential wells are infinitely deep (infinitely large bandgap a-Si$_{1-x}$N$_x$:H) the optical gap of the superlattice material would be expected to be wider than the optical gap of bulk a-Si:H by $h^2/8m^*L^2$ where h is Planck's constant, $m^*$ is the effective mass for electrons in a-Si:H and L is the a-Si:H sublayer thickness. Thus, in this interpretation the optical bandgap would be a linear function of $1/L^2$.

A plot of the optical gap $E_g$ as defined above vs. the reciprocal of the square of the a-Si:H sublayer thickness is shown in FIG. 6. Note that the optical gap is not a linear function of $1/L^2$ as predicted by the simple theory, rather being sublinear. Nevertheless, the magnitude of the total change in the optical gap with layer thickness is consistent with a physically reasonable electronic effective mass $m^*$ (0.1 m < $m^*$ ≦ 1.0 m where m is the free electron mass.)

Also plotted in FIG. 6 is the energy of the peak of the photoluminescence emission band for the same superlattice films. Although the energy of the emission peak increases as L decreases, the L dependence is much weaker than the corresponding L dependence for the optical gap also shown in FIG. 6. The origin of this difference in behavior is unknown. It could be associated with the fact that a two dimensional excitation is four times more strongly bound than a three dimensional excitation, or it may be simply an indication that the distribution of band tail states is broadened by the two dimensional potential wells introduced by the compositional modulation of the superlattices.

ELECTRICAL PROPERTIES

Figure 7:
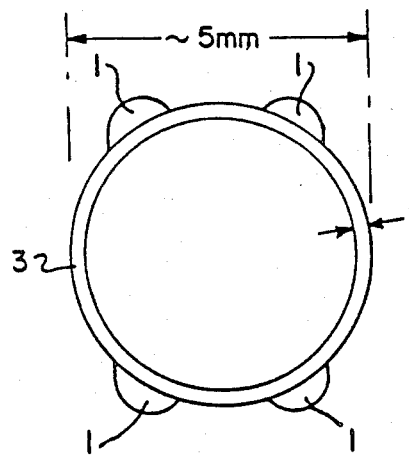
FIG. 7 shows the electrode configuration used in measurements of the in-plane resistivity of superlattice materials.

The electrical resistivity of a series of a-Si:H/a-Si$_{1-x}$N$_x$:H superlattice materials has been studied, both the resistivity in the plane of the sublayers and the resistivity perpendicular to the sublayers. The resistivity in the plane of the sublayers was determined using the sample configuration and electrode pattern shown in FIG. 7. The superlattice material was deposited on two predeposited Cr/n+9-Si:H fingers, through a circular (5 mm diameter hole) shadow mask spaced a few tenths of a millimeter above the substance so as to produce a tapered thickness penumbra a few tenths of a millimeter wide around the perimeter of the film. This approach ensures electrical contact to all of the sublayers in the sometimes highly anisotropic superlattice materials. Perpendicular resistivity measurements were performed on films deposited on Cr/n+a-Si:H coated quartz substrates, which forms an ohmic contact to a SiH. A similarly ohmic contact was made to the top surface of the superlattice film with 2 mm$^2$ area Cr/n+a-Si:H dots.

The room temperature resistivity in the plane of the sublayers is plotted in FIG. 6 as a function of $L^{-2}$ for the same series of a-Si:H/a-Si$_{1-x}$N$_x$:H superlattice materials which had been studied optically. The resistivity in FIG. 6 is normalized to the resistivity of the superlattice with the thickest a-Si:H sublayer, which was 1500 Å thick.

If the Fermi level in the superlattice material remains fixed relative to the edge of the valence band independent of the superlattice size parameter L and the conductivity is due to electrons rather than holes, then the in-plane resistivity is expected to depend on the band gap through the exponential relation $\rho = \rho_o \exp(E/kT)$. Provided the optical gap is a good measure of the band gap, a plot of $kT\ln \rho/\rho_o$ as a function of $1/L^2$ should parallel the optical gap. The logarithmic resistivity scale on the righthand vertical axis in FIG. 2 has been appropriately scaled so that $kT\ln \rho/\rho_o$ in electron volts corresponds to the energy scale in electron volts for the optical gap on the left hand vertical axis. Note that the resistivity increases more rapidly with decreasing superlattice parameter L than expected on the basis of the optical gap alone.

One speculative explanation for the difference between the optical gap and the gap inferred from the resistivity, is that the mobility gap, which is the relevant quantity as far as the resistivity is concerned, increases more rapidly with the two dimensional quantum confinement, than the density of states gap.

The anisotropy in the electrical resistivity, of the a-Si:H/a-Si$_{1-x}$N$_x$:H superlattice materials namely the ratio of the perpendicular resistivity to the in-plane resistivity, varied from >10$^8$ for the thick a-Si:H sublayer material to order 10–100 in the thin a-Si:H sublayer material. The larger anisotropy for the large L material where L is the thickness of the a-Si:H sublayers (a-Si$_{1-x}$N$_x$:H sublayer held at 35Å) confirms the x-ray structural results, namely that thin, laterally coherent amorphous films have been fabricated. The reduction in anisotropy for the small L material results from the much larger in-plane resistivity in this material.

DENSITY OF DEFECTS

The magnitude of the optical absorption coefficient for photon energies less than the optical absorption threshold is a commonly used figure of merit in the characterization of the defect density in semiconductor materials. In a-Si:H, it is well-known that structural defects such as dangling bonds show up as a low energy absorption shoulder whose magnitude is proportional to the density of defects. The optical absorption coefficient in the weakly absorbing subbandgap region is most easily determined from the photoconductivity response spectrum as measured using the technique of Triska et al. (Sol. State Commun. 1981) for example. The absolute magnitude of the low energy absorption is then determined by a match of the high energy part of the photoconductivity spectrum to optical transmission measurements.

Figure 8:
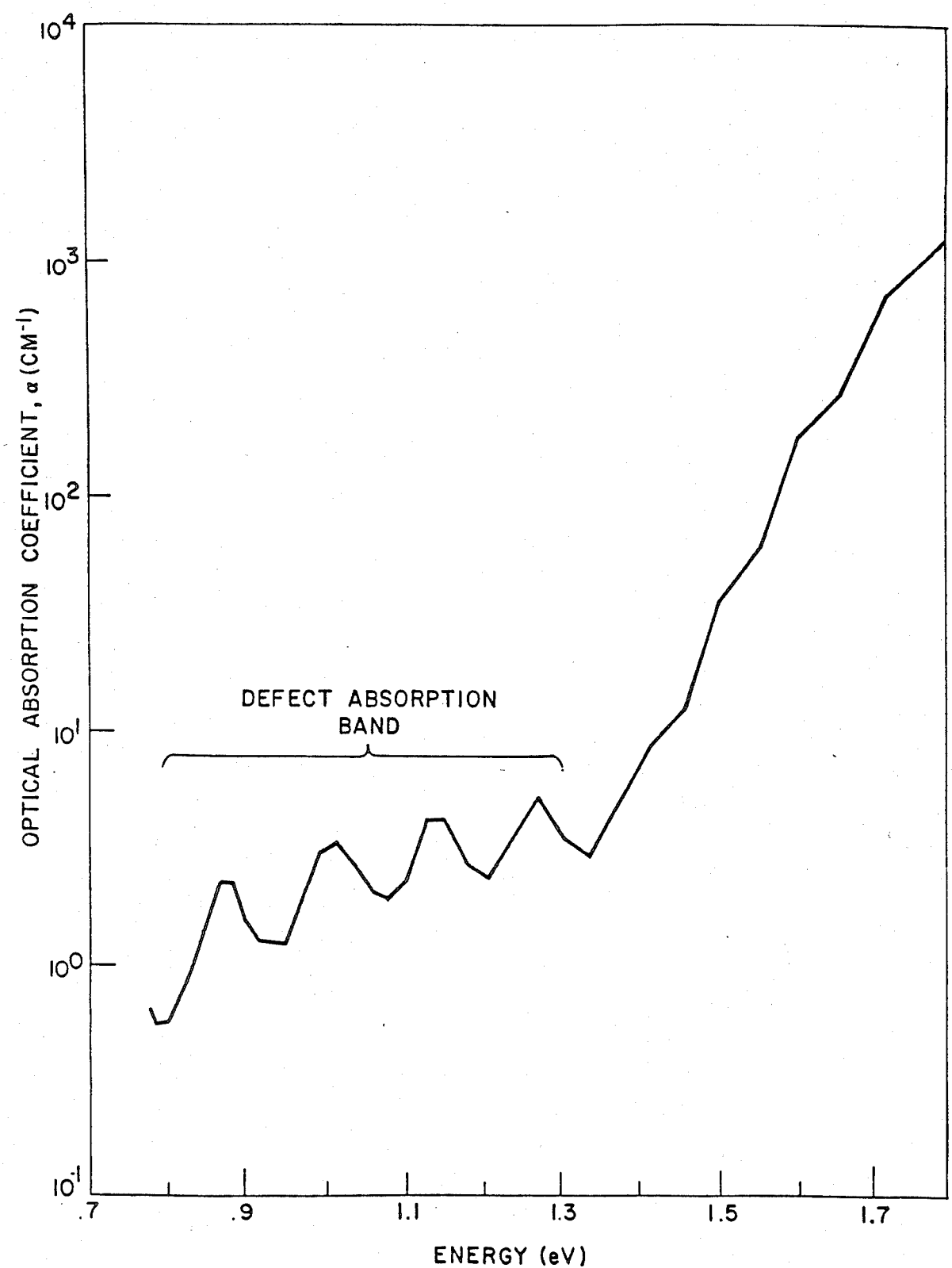
FIG. 8 shows the optical absorption coefficient as a function of photon energy for an amorphous superlattice material comprising about ten periods of 1500A a-Si:H sub-layers and 35A a-Si$_{1-x}$N$_x$:H sub-layers. The weakly energy dependent absorption at low photon energies is associated with structural defects.

The optical absorption coefficient determined as outlined above for photon energies in the vicinity of the optical gap and lower, is shown in FIG. 8 for an amorphous semiconductor superlattice material comprising alternating 1500Å a-Si:H layers and 35Å a-Si$_{1-x}$N$_x$:H layers. The oscillations in the optical absorption are caused by interference fringes generated by reflections at the film-substrate interface and the film-air interface. The optical absorption coefficient for the bulk material is the average of the interference maxima and minima on a logarithmic scale.

The optical absorption at 1.2 ev of about 3 cm$^{-1}$ in FIG. 8, is equivalent to a density of defect states of order $10^{16}$ cm$^{-3}$/ev, which corresponds to approximately one defect in $10^7$ atoms. This defect density is comparable to the defect density in conventional nominally homogeneous a-Si:H films prepared under the same conditions.

X-RAY PROPERTIES

An important test of the structural perfection of layered amorphous semiconductors is obtained by X-ray diffraction. To test the structural quality of the layers and interfaces, the X-ray diffraction measurements were made with 1.5A X-rays, at glancing incidence. Although these experimental conditions fall outside the range of incidence angles and X-ray wavelengths of the X-ray mirrors of the present invention, these conditions are more sensitive to non-uniformity in the structure than measurements made with longer wavelength X-rays. The layered films act as a one dimenonal diffraction grating, giving rise to characteristic diffraction according to Bragg's law:

$$2d \sin \phi_m = m\lambda$$

where $\phi_m$ is the Bragg angle corresponding to the $m^{th}$ order diffraction, d is the repeat distance of the superlattice and $\lambda$ is the wavelength of the x-ray.

In FIG. 9 is shown the characteristic diffraction pattern of an amorphous semiconductor superlattice consisting of 40 periods deposited on a quartz substrate. Each period consists of a 40 Å thick sublayer of a-Si:H-/a-Si$_{1-x}$N$_x$:H and a 30 Å thick sublayer of a-Si$_{1-x}$N$_x$:H. The X-ray measurements were made with $\lambda = 1.54$ Å. The sharpness of the peaks and the magnitude of the higher order reflections provide evidence that the layers are of uniform thickness, smooth and parallel.

In the case of perfectly smooth and parallel layers the magnitude of the m order reflection, R, is given by (see e.g. J. H. Underwood and T. W. Barber P. 170 of the proceedings of the AIP in conference (1981))

$$R_m = (\text{constant}) \left[ \frac{\sin\left(\frac{md_1}{d}\right) \pi^2}{m^4} \right]$$

where d$_1$ and d$_2$ are the thickness of the two sublayers forming the superlattice ($d = d_1 + d_2$). If the layers are rough then the higher harmonics are attenuated according to the expression $$R'_m = R_m \exp\left[ -\left(\frac{Lm\pi}{d} \xi\right)^2 \right]$$

where R$'_m$ is the mth order reflection for the rough superlattice and $\xi$ is the RMS roughness of the layers. By applying the above two equations to our x-ray data we obtained an RMS roughness $\xi = 5$ Å which is less then two monolayers.

TRANSMISSION MICROSCOPY

Another way of checking the perfection of the superlattice is by transmission electron microscopy of a thin section perpendicular to the layers.

Referring to FIG. 10 shows a transmission electron microscope picture of a layered a-Si:H/a-Si$_{1-x}$N$_x$:H amorphous semiconductor superlattice material with a periodic repeat distance of about 50 Å. This figure further demonstrates the existance of laterally continuous, substantially smooth layers.

During the foregoing description of the present invention, interpretations have been given for some of the results contained herein. These interpretations are given for purposes of illustration and which are in no way intended to limit the scope of the invention.

What is claimed is:

1. An X-ray mirror comprising a multilayered material wherein the layers forming the structure are made of amorphous semiconductor or insulator material such that the composition of the layers repeat, periodically said repeat distance being between 8 and 250A.

2. The X-ray mirror of claim 1 wherein said layers are produced by CVD.

3. The X-ray mirror of claim 2 wherein said layers are formed from tetrahedrally elements or alloys containing said tetrahedrally bonded elements.

4. The X-ray mirror of claim 3 wherein said CVD is plasma assisted.

5. The X-ray mirror of claim 1 such that said multilayered material includes a diffusion barrier between layers.

6. The X-ray mirror of claim 1 wherein layers are metals or alloys thereof.

7. The X-ray mirror of claim 6 such that each period of said multi-layered material includes a diffusion barrier between layers.

8. The X-ray mirror of claim 7 wherein said metal layers are Au and Al separated by a silicon or carbon diffusion barrier.

9. The X-ray mirror of claim 3 wherein said tetrahedrally bonded element is silicon.

10. The X-ray mirror of claim 9 wherein said alloy is an alloy silicon with an element selected from the group oxygen, nitrogen, fluorine, and carbon.

11. The X-ray mirror of claim 1 wherein said layers are substantially defect free.

12. The X-ray mirror of claim 1 wherein said layers are substantially smooth and of uniform thickness across each layer.

13. The X-ray mirror of claim 1 wherein said composition of layers repeat more than 8 times.

* * * * *